United States Patent [19]

Satoh et al.

[11] Patent Number: 4,949,210

[45] Date of Patent: Aug. 14, 1990

[54] TAPE CASSETTE

[75] Inventors: Takateru Satoh, Saku; Noboru Uemura, Odawara; Haruo Shiba, Komoro; Kimio Tanaka; Kenkichi Akaoka, both of Saku, all of Japan

[73] Assignee: TDK Corporation, Tokyo, Japan

[21] Appl. No.: 359,219

[22] Filed: May 31, 1989

[30] Foreign Application Priority Data

Jun. 1, 1988 [JP] Japan .............................. 63-71732[U]

[51] Int. Cl.$^5$ ............................................. G11B 23/02
[52] U.S. Cl. .................................................... 360/132
[58] Field of Search ............................... 360/132–133; 242/197–201

[56] References Cited

FOREIGN PATENT DOCUMENTS 60-224176 11/1985 Japan ..................................... 360/132

Primary Examiner—A. J. Heinz
Attorney, Agent, or Firm—Price, Gess & Ubell

[57] ABSTRACT

A tape cassette capable of ensuring firm joining between different resin layers of a casing and exhibiting a good aesthetic property. The tape cassette includes a casing consisting of upper casing member and lower casing member which are integrally made into a two-layer structure of a primary resin layer and a secondary resin layer integrally formed by two-layer molding. The secondary resin layer is formed with a plurality of penetrations and the primary resin layer is joined to the secondary resin layer in a manner to be fitted in the penetrations, resulting in being integral with the secondary resin layer.

10 Claims, 2 Drawing Sheets

TAPE CASSETTE

BACKGROUND OF THE INVENTION

1. Field of the Invention

This invention relates to a tape cassette, and more particularly to a tape cassette which has a tape such as a magnetic tape, a cleaning tape or the like received therein and is adapted to be used in an audio unit, a video unit or the like.

2. Description of the Prior Art

Conventionally, a tape such as a magnetic tape which is used in an audio unit, a video unit or the like is received in a casing in a manner to be wound on a pair of reel hubs rotatably arranged in the casing while extending between the reel hubs. The casing comprises a combination of two half casing members or an upper casing member and a lower casing member which are formed of a synthetic resin in a manner to be monochromatic or polychromatic.

Now, such a conventional casing will be described with reference to FIGS. 5 and 6. The conventional casing, which is generally indicated at reference numeral 100 in FIGS. 5 and 6, includes an upper casing member 102 and a lower casing member (not shown). The lower casing member is constructed in substantially the same manner. The casing members each are provided with a window 104 through which an interior of the casing is visually observed. For this purpose, the window 104 is formed of a transparent synthetic resin, whereas the remaining part of the casing member is generally formed of a different synthetic resin such as an opaque synthetic resin. The window 104 causes a portion of the casing at which the window 104 is provided to be of a two-layer structure of a transparent resin layer and an opaque resin layer, as shown in FIG. 6, wherein an interface between both layers is substantially horizontal as indicated at reference numeral 106 in FIG. 6.

Unfortunately, the conventional casing constructed as described above is disadvantageous in that the interface 106 between the difference resin layers is poor in joining, so that rigidity of the casing 100 is correspondingly reduced to deteriorate damping or vibration-proof properties of the casing, resulting in tending to cause a modulation noise. Also, the above-described construction of the casing does not permit the casing to exhibit a good appearance or aesthetic property, so that a merchandise value of the casing is reduced.

Accordingly, it would be highly desirable to develop a tape cassette which is capable of ensuring firm joining between two distinct or different resin layers of a casing and exhibiting a good appearance or aesthetic property.

SUMMARY OF THE INVENTION

In accordance with the present invention, a tape cassette is provided. The tape cassette includes a casing comprising an upper casing member and a lower casing member joined together, and a pair of reel hubs which are rotatably arranged in the casing and on which a tape is wound in a manner to extend therebetween. The upper casing member and lower casing member each are made of a primary resin layer and a secondary resin layer integrally formed by two-layer molding such as two-color injection molding. The secondary resin layer is formed with a plurality of penetrations in a dotted manner, and the primary resin layer is joined to the secondary resin layer in such a manner that at least a part thereof is fitted in the penetrations, resulting in being integrally joined to the secondary resin layer.

In a preferred embodiment of the present invention, the primary resin layer is formed of a transparent or translucent resin material and the secondary resin layer is formed of an opaque resin material, and the primary resin layer is substantially laminated on the secondary resin layer.

In a preferred embodiment of the present invention, the upper and lower casing members each are provided with a window, which is formed at the primary resin layer.

In a preferred embodiment of the present invention, the penetrations are provided at a portion of the casing member except the window.

In a preferred embodiment of the present invention, the penetrations are formed into a circular or rectangular shape and arranged in a regular manner at intervals in longitudinal and lateral directions of the casing. Alternatively, the penetrations are arranged in an irregular manner.

In a preferred embodiment of the present invention, outer surfaces of the primary and secondary resin layers are flush with each other. Alternatively, an outer surface of a portion of the primary resin layer fitted in the penetrations is depressed from that of the secondary resin layer.

In a preferred embodiment of the present invention, the primary resin layer is so arranged that its inner surface covers an inner surface of the secondary resin layer. Alternatively, the primary resin layer is so arranged that its inner surface is depressed from an inner surface of the secondary resin layer.

Accordingly, it is an object of the present invention to provide a tape cassette which is capable of accomplishing firm joining between different resin layers of a casing.

It is another object of the present invention to provide a tape cassette which is capable of substantially increasing rigidity of a casing to improve vibration-proof properties of the casing and minimize modulation noise of the casing.

It is a further object of the present invention to provide a tape cassette which is capable of permitting its design to be widely varied as desired.

It is still another object of the present invention to provide a tape cassette which is capable of exhibiting a good appearance or aesthetic property.

It is yet another object of the present invention to provide a tape cassette which is capable of simplifying its manufacturing.

It is still a further object of the present invention to provide a tape cassette which is capable of significantly improving workability.

It is yet a further object of the present invention to provide a tape cassette which is capable of permitting its assembling to be substantially automatically carried out.

It is an even further object of the present invention to provide a tape cassette which is capable of exhibiting satisfactory durability.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims

BRIEF DESCRIPTION OF THE DRAWINGS

For a fuller understanding of the invention, reference is had to the following description taken in connection with the accompanying drawings; wherein.

DETAILED DESCRIPTION OF THE PREFERRED EMBODIMENT

Figure 1:
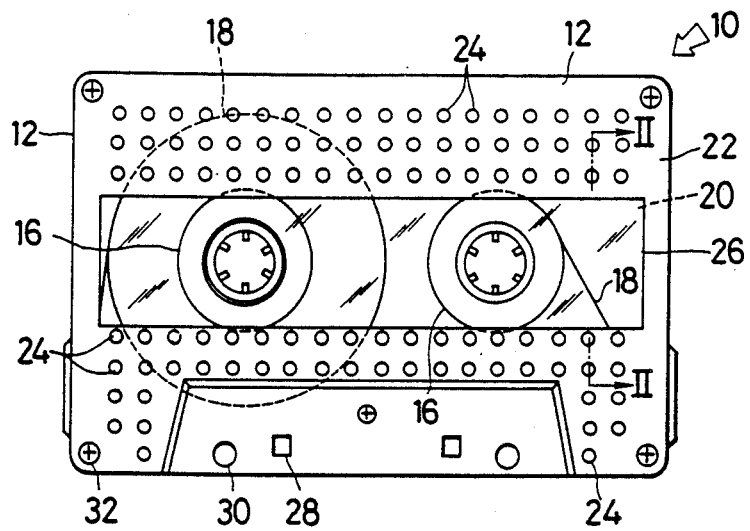
FIG. 1 is a plan view showing an embodiment of a tape cassette according to the present invention.

Now, a tape cassette according to the present invention will be described hereinafter with reference to FIGS. 1 to 4, wherein like reference numerals designate like or corresponding parts throughout.

Figure 2:
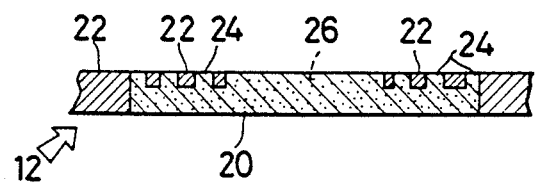
FIG. 2 is a fragmentary enlarged vertical sectional view taken along line II—II of FIG. 1.

FIGS. 1 and 2 illustrate an embodiment of a tape cassette according to the present invention. A tape cassette of the illustrated embodiment includes a casing 10 comprising an upper casing member 12 and a lower casing member joined together so as to define a space therein. In FIGS. 1 and 2, the lower casing member is not shown because it may be constructed in substantially the same manner as the upper casing member 12. In the casing 10 are arranged a pair of reel hubs 16 in a manner to be rotatable, on which a tape 18 such as a magnetic tape, a cleaning tape or the like are wound in a manner to extend therebetween.

The upper casing member 12 and lower casing member each are made of a primary resin material and a secondary resin material into a two-layer structure consisting of a primary resin layer 20 and a secondary resin layer 22 integrally formed by two-layer molding such as two-color injection molding. The primary resin layer 20 is formed integral with the secondary resin layer 22 by fitting a part of the primary resin in a plurality of penetrations 24 formed at the secondary resin layer 22 in a dotted manner.

In the illustrated embodiment, the primary resin layer 20 is formed of a transparent or translucent resin material, which may be colorless or colored, and the secondary resin layer 22 is formed of an opaque resin material. In the illustrated embodiment, the primary resin layer 20 is integrally laminated on the secondary resin layer 22 to permit the residue of the tape 18 to be visibly observed. In particular, the penetrations 24 each are in the form of a circular or rectangular aperture and provided at a region of the casing member except a window 26 through which an interior of the casing is visually observed. For this purpose, the window is arranged at the secondary resin layer 22. Also, the penetrations 24 are arranged at intervals in the longitudinal and lateral directions of the casing member, to thereby increase an aesthetic property of the tape cassette. However, arrangement of the penetrations 24 in any irregular manner likewise increases the aesthetic property. They may be arranged at any desired degree of freedom so that any desired pattern or design may be formed.

Thus, in the illustrated embodiment, the casing member 12 is integrally formed with the transparent window 26 by two-color injection molding techniques, during which an interface between the different resin layers 22 and 24 are reinforced by cooperation between the penetrations 24 arranged in a dotted manner and the portion of the primary resin layer 20 fitted in the penetrations 24.

In FIG. 1, reference numerals 28, 30 and 32 designate holes for positioning the tape cassette, capstan inserting holes and fastening screws 32, respectively.

Figure 3:
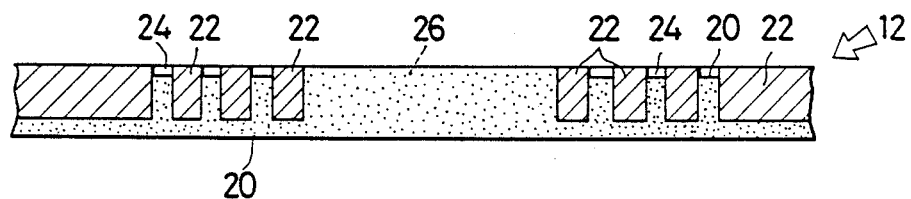
FIGS. 3 and 4 each are a fragmentary enlarged vertical sectional view showing another embodiment of a tape cassette according to the present invention.

FIG. 3 shows another embodiment of a tape cassette according to the present invention. In a tape cassette of the illustrated embodiment, a primary transparent resin layer 20 is likewise formed integral with a secondary opaque resin layer 22. A portion of the primary resin layer 20 fitted in penetrations 24 is arranged in such a manner that an outer surface of the layer 20 is positioned inside that of the layer 22, resulting in the portion of the layer 20 being depressed from the outer surface of the layer 22. Thus, an outer surface of a casing member 12 is substantially defined by the outer surface of the secondary resin layer 22. An outer surface of a portion of the primary resin layer 20 forming a window 26 is substantially flush with the secondary resin layer 22.

Also, in FIG. 3, the primary resin layer 20 may be so arranged that an inner surface thereof covers an inner surface of the secondary resin layer 22. The outer surface of the primary resin layer 20 may be formed so as to cover the outer surface of the secondary resin layer 22.

Figure 4:
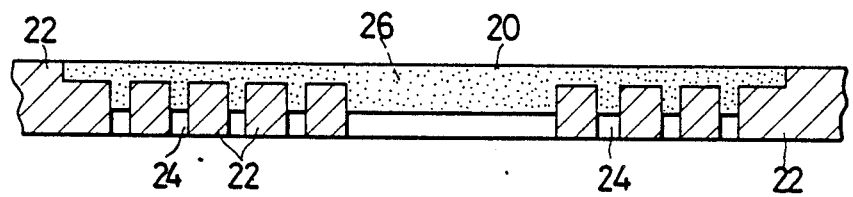
Figure 5:
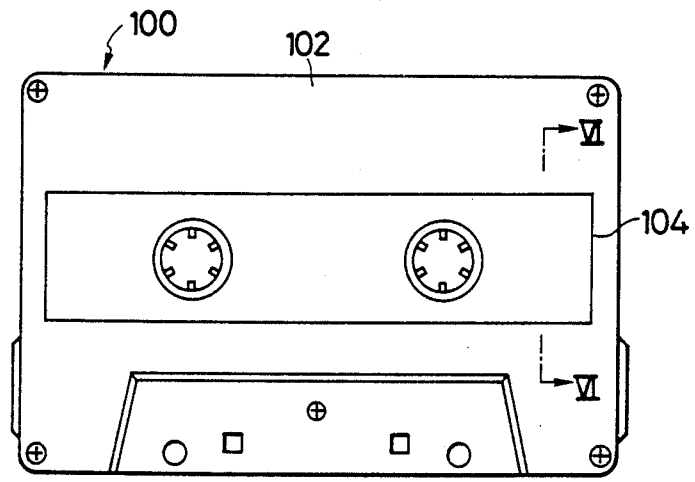
FIG. 5 is a plan view showing a conventional tape cassette.
Figure 6:
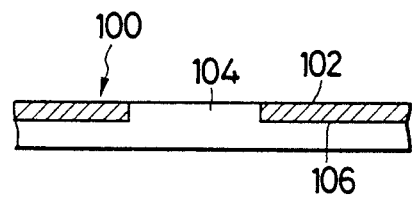
FIG. 6 is a fragmentary enlarged sectional view taken along line VI—VI of FIG. 5.

FIG. 4 shows a further embodiment of a tape cassette according to the present invention. In a tape cassette shown in FIG. 4, an outer surface of a portion of a secondary resin layer 22 at which penetrations 24 are formed is depressed from that of the remaining part of the layer 22 and a primary resin layer 20 is so formed that an outer surface thereof is projected from the outer surface of the portion of the secondary resin layer 22, resulting in being flush with the outer surface of the remaining part of the layer 22. Also, the primary resin layer 20 is formed so that an inner surface thereof is wholly depressed from that of the secondary resin layer 22.

As can be seen from the foregoing, in the tape cassette of the present invention, each of the upper and lower casing members is integrally made of the primary and secondary resins into a two-layer structure comprising the primary and secondary layers integrally formed by two-layer molding, wherein the primary resin layer is arranged integral with the secondary resin layer in the manner that a part of the primary resin layer is securely fitted in a number of the penetrations formed at the secondary resin layer in a dotted manner. Such construction of the present invention enhances adhesion or joining between both resin layers to increase in rigidity of the casing, resulting in the vibration-proof properties and modulation noise of the casing being improved. Also, the construction of the present invention permits the cassette to exhibit a good aesthetic property to increase a merchandise value of the cassette and minimizes a variation of quality of the cassette while providing the cassette with high accuracy.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all the generic and specific features of the invention herein described and all statements of the scope of the invention which, as a matter of language, might be said to fall therebetween.

What is claimed is:

1. A tape cassette comprising:
   a casing comprising an upper casing member and a lower casing member joined together; and
   a pair of reel hubs which are rotatably arranged in said casing and on which a tape is wound in a manner to extend therebetween;
   each of said upper casing member and lower casing member being made of a primary resin layer and a secondary resin layer integrally formed by two-layer molding;
   said secondary resin layer being formed with a plurality of penetrations in a dotted manner;
   said primary resin layer being joined to said secondary resin layer in such a manner that at least a part thereof is fitted in said penetrations, resulting in being integral with said secondary resin layer.

2. A tape cassette as defined in claim 1, wherein said primary resin layer is formed of a transparent or translucent resin material and said secondary resin layer is formed of an opaque resin material; said primary resin layer being substantially laminated on said secondary resin layer.

3. A tape cassette as defined in claim 2, wherein said upper and lower casing members each are provided with a window, said window being formed at said primary resin layer.

4. A tape cassette as defined in claim 3, wherein said penetrations are provided at a portion of said casing member except said window.

5. A tape cassette as defined in claim 4, wherein said penetrations are formed into a circular or rectangular shape and arranged in a regular manner at intervals in longitudinal and lateral directions of said casing.

6. A tape cassette as defined in claim 4, wherein said penetrations are arranged in an irregular manner.

7. A tape cassette as defined in claim 2, wherein outer surfaces of said primary and secondary resin layers are flush with each other.

8. A tape cassette as defined in claim 7, wherein said primary resin layer is so arranged that its inner surface is depressed from an inner surface of said secondary resin layer.

9. A tape cassette as defined in claim 2, wherein an outer surface of a portion of said primary resin layer fitted in said penetrations is depressed from that of said secondary resin layer.

10. A tape cassette as defined in claim 9, wherein said primary resin layer is so arranged that its inner surface covers an inner surface of said secondary resin layer.

* * * * *